June 20, 1967 A. G. RICHTER, JR 3,326,389
RACK
Filed July 22, 1965
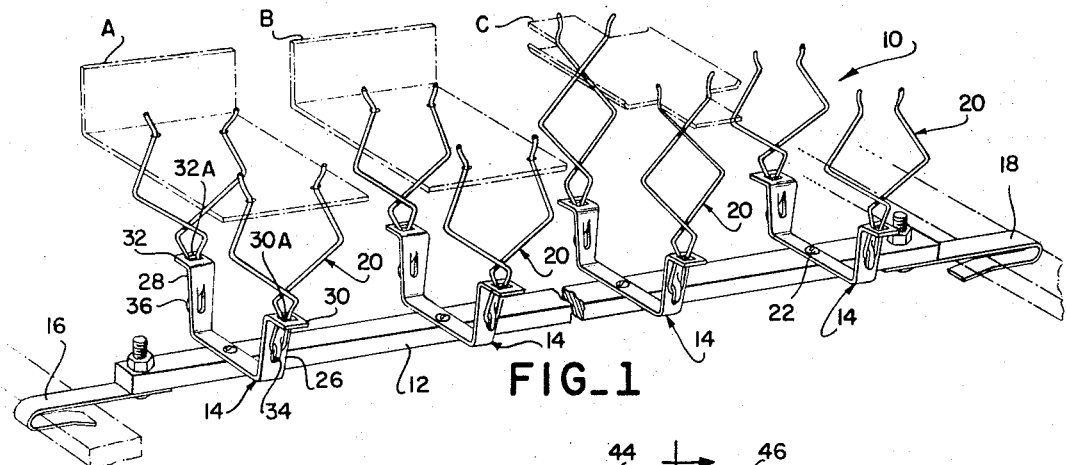
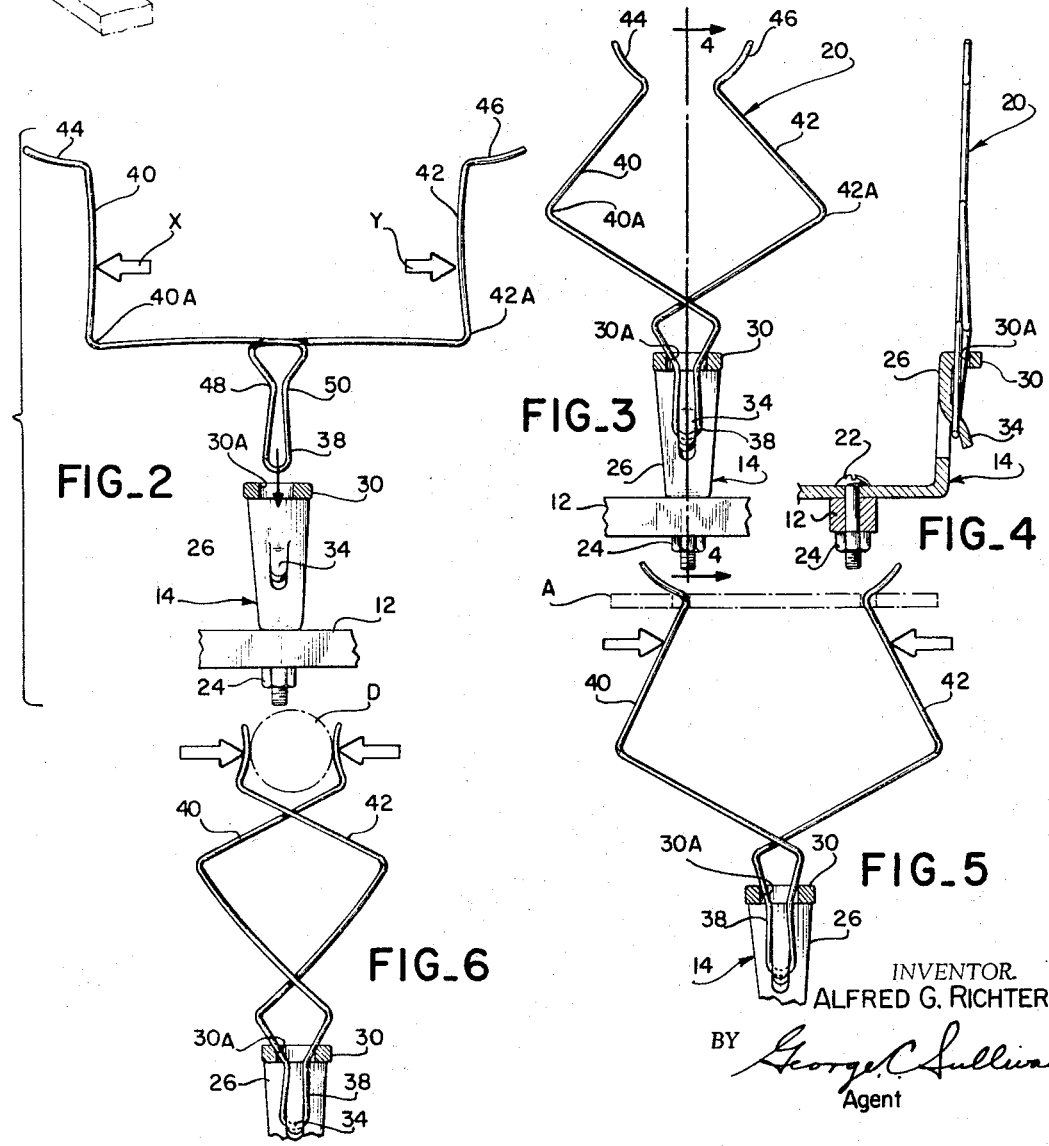
INVENTOR.
ALFRED G. RICHTER, JR.
BY George C. Sullivan
Agent United States Patent Office 3,326,389
Patented June 20, 1967

3,326,389
RACK
Alfred G. Richter, Jr., Granada Hills, Calif., assignor to Lockheed Aircraft Corporation, Burbank, Calif.
Filed July 22, 1965, Ser. No. 474,061
4 Claims. (Cl. 211—86)

This invention relates to a rack for supporting parts.

Racks of a general type as disclosed herein usually comprise an elongated bar or rod having a series of hooks for supporting metallic or non-metallic parts in a position whereby these parts may be processed in any manner. There have been numerous problems in the arrangement of prior racks due to the inability of the rack to support a series of different size parts. Usually the racks are useful for supporting only a single size of parts and therefore require a multitude of different size racks and supporting hooks in differently spaced relationship on the racks to accommodate many different size parts.

Another problem which has existed in the industry is in the manner in which the hooks are mounted upon the paint rack. With repeated use of these hooks on a rack, it is often required that the hooks must be replaced due to breakage or other natural reasons. Heretofore, a fastening device has been used to secure the hook to the rack and has caused problems in both removal and successful assembly due to corrosion built up on these fasteners.

In accordance with the present invention, most of the problems of the prior racks have been eliminated due to the particular arrangement of a spring clip mounted on an elongated bar in such a manner that it permits the spring clip to be quite uniform and is able to secure a great variety of size parts. The spring clip has two main advantages in its ability to be easily assembled or withdrawn from the rack which is especially useful when mounting parts on the rack. Another advantage of this spring clip is its ability to support different size parts and still is able to apply pressure to the parts in such a manner that any operation can be performed without undue difficulty.

In a broad sense, the present invention is directed to a rack that includes an elongated bar having a bracket secured along it with a tab extending from the bracket. The bracket has an opening therethrough which is aligned with the bracket tab. A spring clip having a loop extending through the bracket opening is hooked upon the bracket tab and permits withdrawal and assembly of the clip without the use of conventional fasteners.

This invention extends to the spring clip per se which is formed from a length of spring wire having a loop along its length and includes a pair of legs extending from the loop and being bent toward each other at a point spaced from the wire loop. The wire legs each have an extremity which is directed away from the other leg and this extremity is useful in supporting metal parts.

The term "wire" as used herein means a metallic or non-metallic rod or thin thread having any type of cross section and being formed from single or multiple strands.

The term "loop" as used herein means a circular or non-circular figure formed by a line, thread, or wire that crosses itself at least once.

The term "process" as used herein means any method used in any manufacturing step and includes such methods as anodizing, painting, iridizing, chromating, electroplating, and any other chemical or electrical method.

Other advantages and features of the invention will become more apparent from the specification and the drawings in which:

FIGURE 1 is a perspective view of a rack constructed in accordance with the present invention and illustrating the support of a plurality of parts upon spring clips;

FIGURE 2 is a side elevation of a spring clip disposed in a position to be inserted within a bracket mounted on a rack;

FIGURE 3 is a side elevation of the spring clip shown in FIGURE 2 mounted on the bracket;

FIGURE 4 is a cross sectional view taken along 4—4 of FIGURE 3 and showing details of a tab securing the spring clip within the rack bracket;

FIGURE 5 illustrates a spring clip supporting a part and schematically illustrates the force subjected to part; and FIGURE 6 is a side elevation of a spring clip supporting a circular part and illustrating how the spring clip can be deformed to engage parts of a small cross section.

Referring now to FIGURE 1, a rack 10 constructed in accordance with the present invention includes an elongated bar 12 having a plurality of U-shaped brackets 14 mounted along its length. The bar 12 has a pair of supporting hooks 16 and 18 secured at opposite ends to support the rack in a horizontal position as shown in FIGURE 1 or, alternatively, it may be suspended in a vertical position (not shown) by mounting hooks 16 or 18 from a conventional support (not shown). Each bracket has a pair of spring clips 20 mounted thereon and these clips are used to support parts A, B and C either by inserting a perforated part upon the clip or using one or more clips to retain the part by applying a compressive load upon it.

Each of the U-shaped brackets 14 is secured to the elongated bar 12 by a bolt 22 extending through both the bracket and the bar and this bolt is secured in position by a nut 24 being threaded thereon and preventing any relative movement between the bracket and the bar. This bracket 14 is symmetrically shaped and has a pair of substantially parallel side walls 26 and 28 with respective flanges 30 and 32 extending at substantially right angles to their respective side walls and the flange being in the same plane. A tab 34 is formed from the side wall 26 and has a substantially elongated shape being curvilinear at its extremity and having parallel side walls. The tab 34 projects from the side wall permitting the spring clip 20 to be hooked upon the tab. This tab is a feature of this invention since it cooperates with the spring clip and serves the purpose of a fastener without the need of an additional part. A comparable tab 36 is formed from the side wall 28 in substantially the same fashion as tab 34. An oblong opening 30A is formed through the flange 30 and is aligned with the tab 34 as best illustrated in FIGURE 3. A similar oblong opening 32A is formed in the flange 32 and is also aligned with tab 36.

Referring particularly now to FIGURES 2 and 3, the spring clip 20 is formed with an irregularly shaped loop 38 along its length and has a pair of legs 40 and 42 which extend at an obtuse angle from the loop 38 when the spring clip is in a normal position. Each respective leg is bent at a point 40A and 42A toward each other and are bent in the same plane as best seen in FIGURE 4. Each leg 40 and 42 has a respective extremity or tip 44 and 46 which is bent away from the opposite tip and is slightly curvilinear in profile. It is to be noted that as illustrated in FIGURE 4, the entire spring clip 20 is substantially in the same plane when viewing the clip in a side elevation. The spring clip loop 38 includes a pair of kinks 48 and 50 that are directed toward each other and change the distance across the loop to a minimum. These kinks serve two purposes and are an important feature of the invention in that this particular shape permits the loop 38 to be inserted into the bracket when the legs 40 and 42 are expanded, thereby tending to compress the loop 38 and also serve a purpose of providing a nesting area of the spring clip within the bracket when it is in an assembled position as illustrated in FIGURE 3.

Referring again to FIGURES 2, 3 and 4, in order to mount the spring clip 20 upon the bracket 14, the legs 40 and 42 are spread apart by applying a force in respective directions X and Y as indicated as arrows in FIGURE 2 and in doing so, the loop 38 compresses, permitting this loop to enter the opening 30A on the flange 30 and the clip is forced into the bracket until the loop 38 is hooked over the tab 34. An upward movement away from the bracket will complete the hooking of the loop around the tab and upon the release of the legs 40 and 42, the loop kinks 48 and 50 engage the bracket 14 at the opening 30A. Accordingly, the tab 34 prevents removal of the spring clip and the resiliency of the wire forming the clip 20 urges the loop 38 into frictional engagement with the bracket and helps prevent accidental removal of the clip.

In operation, and referring now to all the figures, parts such as A and B shown in FIGURE 1, are mounted upon clips 20 by inserting the tips 44 and 46 into the respective openings in the parts A and B. The resiliency of the clip 20 will force the part to remain on the clip due to the natural tendency of the resilient wire to keep the parts from moving from the position as shown in FIGURE 5. For mounting parts such as part C illustrated in FIGURE 1 or the circular part D as illustrated in FIGURE 6, the legs 40 and 42 are recrossed a second time as illustrated in FIGURE 6, thereby permitting the tips 40 and 46 to engage the part and then apply a compressive force to force the part to assume its position and prevent accidental removal.

While not illustrated, parts of a larger size than that illustrated in FIGURE 1 may be mounted upon rack 10 with ease by removing one or more clips 20 and thereby permit the part to be mounted upon the respective extremity of the clip in much the same manner as that illustrated in FIGURE 1.

It is a feature of this invention to mount the spring clip on the brackets without the use of fasteners and thereby eliminate the need for removal of the clip by destroying the fastener or the clip when maintenance is necessary. The clip and the bracket, in accordance with the present invention, permit assembly and disassembly at any time by merely using manipulation of the spring clip and without undue and complicated procedures as heretofore known in the prior art.

While a particular configuration is illustrated for the legs of the spring clip, it would be within the skill of the art to change the shape of these legs or the shape of the bracket to complement a particular type of shape of part to be supported on the rack without departing from the spirit of this invention. The rack, in accordance with this invention, can also be used for multiple purposes and its invention is for basically supporting parts upon a rack while performing any process.

I claim:
1. A rack comprising:
an elongated bar;
bracket means being secured along the bar and including a tab extending from the bracket means;
the bracket means having an opening therethrough being aligned with the tab; and
a spring clip having a loop extending through the opening and being hooked on the tab.

2. A rack in accordance with claim 1 wherein the spring clip loop is compressible and is resiliently urged against the sides of the opening.

3. A rack in accordance with claim 1 wherein the spring clip further includes a pair of legs extending from the loop and being spaced apart from each other and each having an extremity which is bent away from the other leg; and
the spring clip loop being shaped that it compresses when the legs are pulled apart and permits the loop to be inserted into the opening.

4. A rack in accordance with claim 1 wherein the spring clip loop is compressible and of a normal size which is larger than the opening;
the spring clip having a pair of inwardly directed kinks on opposite sides of the loop directed toward each other; and
the spring clip further having a pair of flexible legs extending from the loop and in response to a flexing of the legs away from the loop, whereby upon compressing the loop, it can be inserted into the opening, with the loop kinks engaging the sides of the opening.

References Cited
UNITED STATES PATENTS

| | | | |
|---|---|---|---|
| 1,281,680 | 10/1918 | Smith | 269—254 X |
| 2,290,645 | 7/1942 | Lange | 248—43 |
| 2,858,265 | 10/1958 | Schneider | 204—97 |
| 2,586,940 | 2/1952 | Graham | 24—261 |
| 2,958,914 | 11/1960 | Krach | 24—73 |

JOHN PETO, *Primary Examiner.*

CLAUDE A. LE ROY, *Examiner.*

W. D. LOULAN, *Assistant Examiner.*